United States Patent
Alumbaugh (10) Patent No.: US 11,466,425 B2
(45) Date of Patent: Oct. 11, 2022

(54) LAND PLANE

(71) Applicant: Brian Alumbaugh, Mccrory, AR (US)

(72) Inventor: Brian Alumbaugh, Mccrory, AR (US)

(*) Notice: Subject to any disclaimer, the term of this patent is extended or adjusted under 35 U.S.C. 154(b) by 389 days.

(21) Appl. No.: 16/736,147

(22) Filed: Jan. 7, 2020

(65) Prior Publication Data
US 2020/0217041 A1  Jul. 9, 2020

Related U.S. Application Data (60) Provisional application No. 62/789,589, filed on Jan. 8, 2019.

(51) Int. Cl.
| | |
|---|---|
| E02F 3/76 | (2006.01) |
| A01B 63/24 | (2006.01) |
| E02F 3/815 | (2006.01) |
| A01B 35/22 | (2006.01) |
| A01B 35/04 | (2006.01) |

(52) U.S. Cl.
CPC .......... *E02F 3/7663* (2013.01); *A01B 63/245* (2013.01); *E02F 3/815* (2013.01); *A01B 35/04* (2013.01); *A01B 35/22* (2013.01)

(58) Field of Classification Search
CPC ........ E02F 5/027; E02F 3/815; E02F 3/7663; E02F 3/7686; E02F 3/7613; A01B 35/04; A01B 35/22; A01B 13/02
See application file for complete search history.

(56) References Cited

U.S. PATENT DOCUMENTS

| | | | | |
|---|---|---|---|---|
| 1,166,197 A | | 12/1915 | Elsey | |
| 1,247,135 A | * | 11/1917 | Monroe et al. | E02F 3/7672 172/799.5 |
| 1,476,263 A | * | 12/1923 | Martin | E02F 3/7668 172/679 |
| 1,587,625 A | * | 6/1926 | Adams | E02F 3/7663 172/627 |
| 1,742,799 A | * | 1/1930 | Andrew | E02F 3/7663 172/191 |
| 1,756,329 A | * | 4/1930 | Andrew | E02F 3/7663 172/414 |
| 1,807,639 A | * | 6/1931 | Stocker | E02F 3/7627 172/741 |
| 1,833,878 A | * | 11/1931 | Adams | E01C 23/082 172/780 |
| 2,128,889 A | * | 9/1938 | Allen | E02F 3/7663 172/393 |

(Continued)

OTHER PUBLICATIONS

U.S. Appl. No. 10/772,659, filed Jan. 2, 2019.

*Primary Examiner* — Jessica H Lutz
(74) *Attorney, Agent, or Firm* — Thompson Coburn LLP (57) ABSTRACT

A land plane that may be moved over an agricultural field to smooth any irregularities in the surface of the field is pulled by a tow vehicle and has a blade assembly in a general diamond shape. The general diamond shape may be between 30 and 35 feet wide and 35 and 40 feet long. Thus, the land plane may have a sufficient length for drag and earth moving capability to economically and properly level a field, and a sufficient width to cover a substantially large area in single pass over the field. Further, the land plane may have foldable wing sections that enable the land plane to be transported over a typical state or county road or highway.

19 Claims, 6 Drawing Sheets

(56) References Cited

U.S. PATENT DOCUMENTS

| | | | | |
|---|---|---|---|---|
| 2,142,262 A * | 1/1939 | Beckham | E02F 3/7663 | 404/96 |
| 2,230,704 A * | 2/1941 | Sorensen | E02F 3/7613 | 172/815 |
| 2,668,376 A * | 2/1954 | Briscoe | E02F 5/027 | 37/366 |
| 2,734,293 A | 2/1956 | Barnes | | |
| 2,787,846 A * | 4/1957 | Everds | E02F 3/7668 | 172/784 |
| 2,840,971 A * | 7/1958 | Greeson | A01B 21/08 | 172/466 |
| 2,842,874 A | 7/1958 | Shumaker et al. | | |
| 2,849,809 A * | 9/1958 | Chattin | E02F 3/7663 | 37/372 |
| 2,866,281 A * | 12/1958 | Breaux | E02F 3/7668 | 172/744 |
| 3,043,034 A * | 7/1962 | Kober | E02F 3/7663 | 172/780 |
| 3,063,178 A * | 11/1962 | Purdy | E02F 3/7663 | D15/27 |
| 3,172,218 A * | 3/1965 | Constantin | E02F 3/7668 | 280/444 |
| 3,206,879 A * | 9/1965 | Grover | E02F 5/027 | 37/366 |
| 3,348,323 A * | 10/1967 | Purdy | E02F 3/7668 | 172/417 |
| 3,506,074 A * | 4/1970 | Abbott | E02F 3/7663 | 172/780 |
| 4,217,962 A | 8/1980 | Schaefer | | |
| 4,491,053 A * | 1/1985 | Bar-Nefy | E02F 3/8157 | 89/36.13 |
| 4,614,240 A | 9/1986 | Miller | | |
| 4,898,247 A | 2/1990 | Springfield | | |
| 5,213,165 A * | 5/1993 | Dunn | A01B 31/00 | 172/684.5 |
| 5,535,832 A | 7/1996 | Benoit | | |
| 5,775,438 A * | 7/1998 | Confoey | E02F 3/815 | 172/811 |
| 5,890,546 A | 4/1999 | Kerpash, Sr. | | |
| 6,119,792 A | 9/2000 | Almer | | |
| 7,063,166 B1 | 6/2006 | Grosberg | | |
| 7,600,576 B2 * | 10/2009 | Gayer | E02F 3/7686 | 172/684.5 |
| D615,562 S * | 5/2010 | Kelly | A01B 21/08 | D15/27 |
| 7,802,383 B2 * | 9/2010 | Dufort | E01H 4/02 | 37/221 |
| 8,418,777 B1 | 4/2013 | Grossen | | |
| 8,732,993 B2 | 5/2014 | Hruska et al. | | |
| 8,813,864 B2 | 8/2014 | Layton | | |
| 9,371,627 B2 * | 6/2016 | Penner | E02F 3/8152 | |
| 9,982,400 B1 * | 5/2018 | Davis | E01C 19/178 | |
| 10,017,907 B1 * | 7/2018 | Davis | E02F 3/7663 | |
| 10,711,432 B2 * | 7/2020 | White | E02F 5/027 | |
| 2005/0173138 A1 * | 8/2005 | Taylor | E02F 3/7622 | 172/799.5 |
| 2013/0284466 A1 | 10/2013 | Layton | | |

\* cited by examiner

LAND PLANE

RELATED APPLICATION DATA

This application claims the benefit of U.S. provisional application Ser. No. 62/789,589, filed Jan. 8, 2019, the disclosure of which is incorporated by reference herein.

BACKGROUND

The disclosure is directed to agricultural implements, and more in particular, to agricultural implements for smoothing the surface of a field. More in particular, the disclosure is directed to a land plane that may be moved over an agricultural field to smooth any irregularities in the surface of the field. The land plane may be pulled by a tow vehicle, e.g., a typical agricultural tractor, over the surface of the agricultural field to smooth and level any irregularities in the surface of the field. As described herein, the land plane has a blade assembly in a general diamond shape. In one aspect, the general diamond shape may be between 30 and 35 feet wide and 35 and 40 feet long. Thus, the land plane may have a sufficient length for drag and earth moving capability to economically and properly level a field, and a sufficient width to cover a substantially large area in single pass over the field. Further, the land plane may have foldable wing sections that enable the land plane to be transported over a typical state or county road or highway.

DETAILED DESCRIPTION OF THE INVENTION

Figure 1:
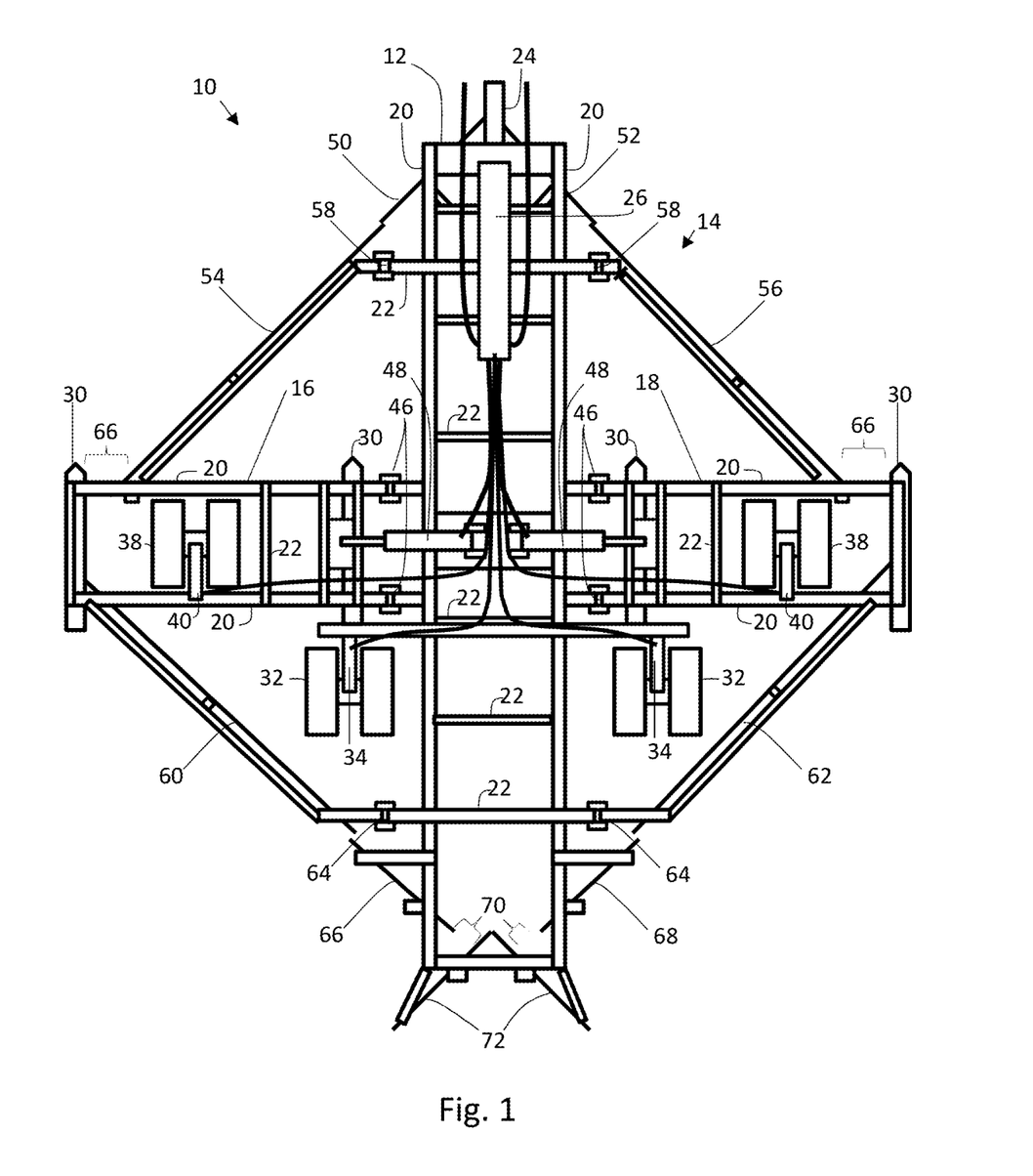
FIG. 1 is a top plan view of the land plane with the pivoting blade assemblies shown in a lowered, deployed position for use in leveling.
Figure 2:
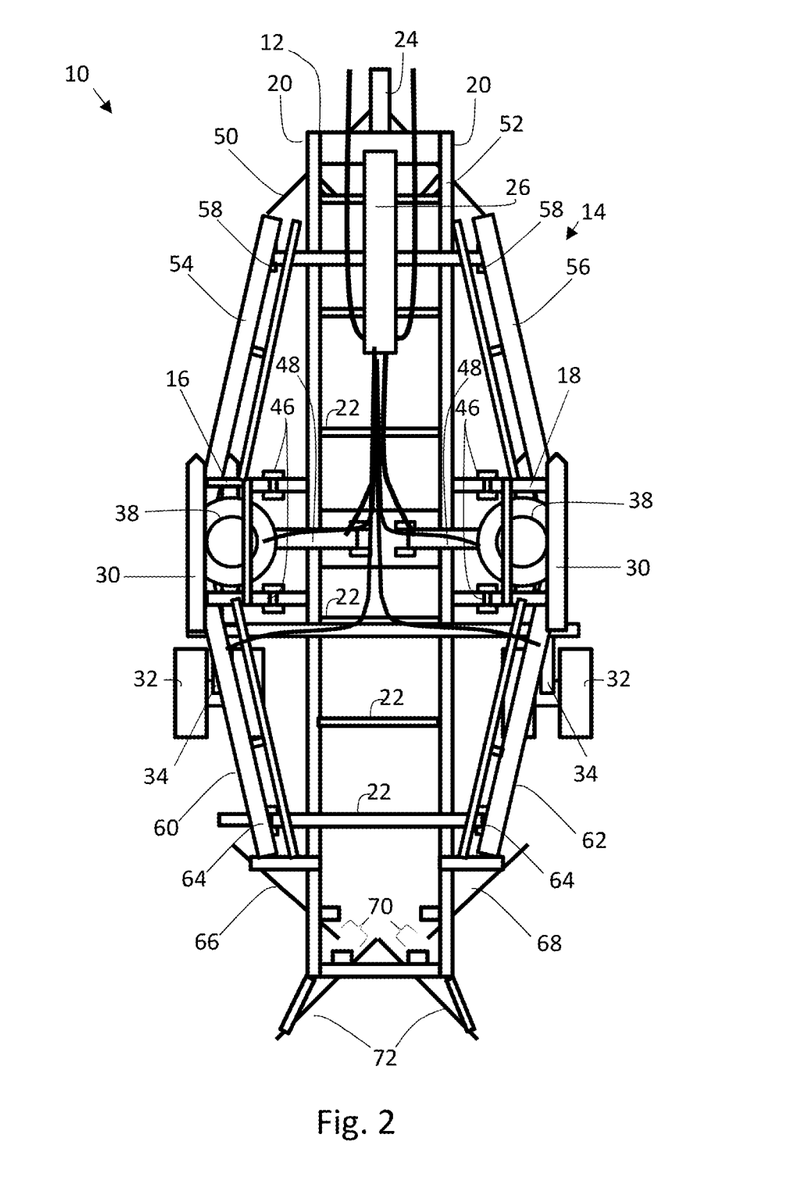
FIG. 2 is a top plan view similar to FIG. 1, but with the pivoting blade assemblies shown in a raised or retracted, folded position.
Figure 3:
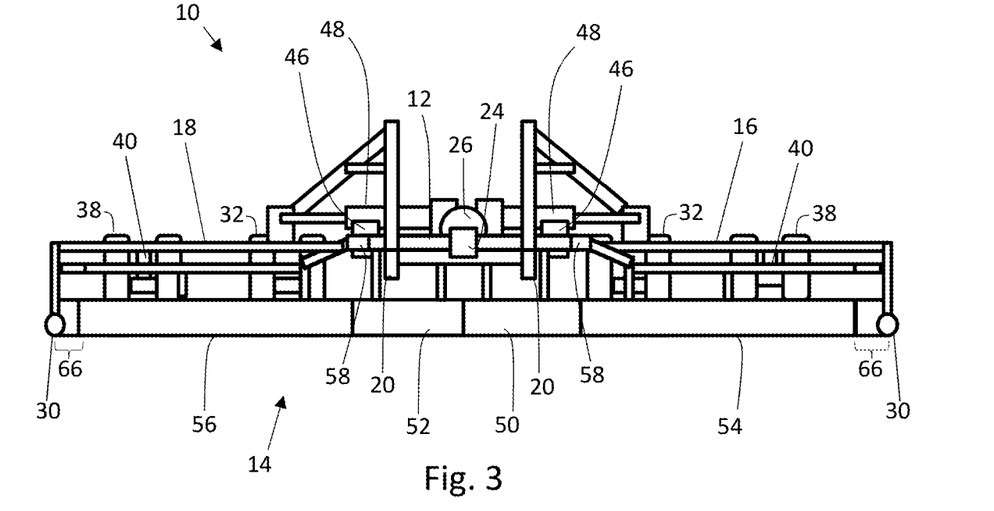
FIG. 3 is a front view of the and plane of FIG. 1.
Figure 4:
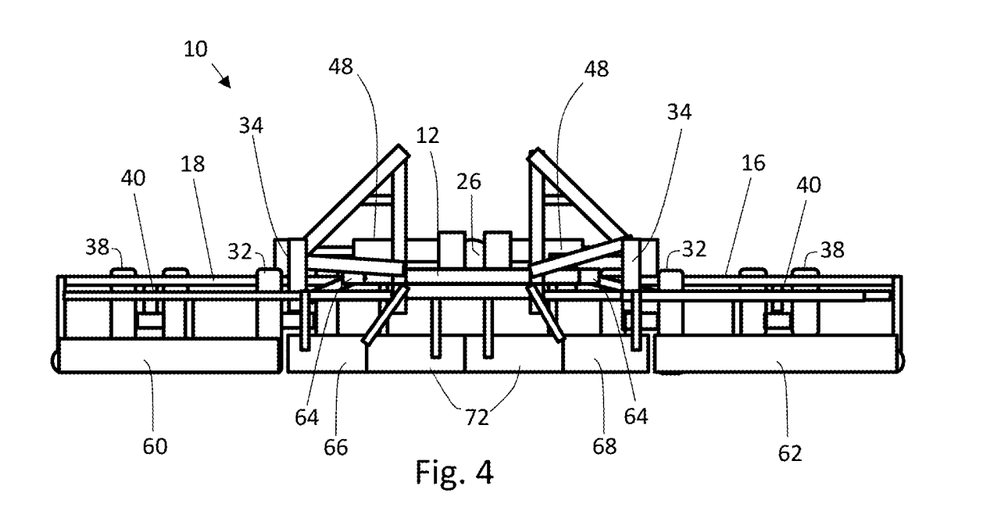
FIG. 4 is a rear view of the land plane of FIG. 1.
Figure 5:
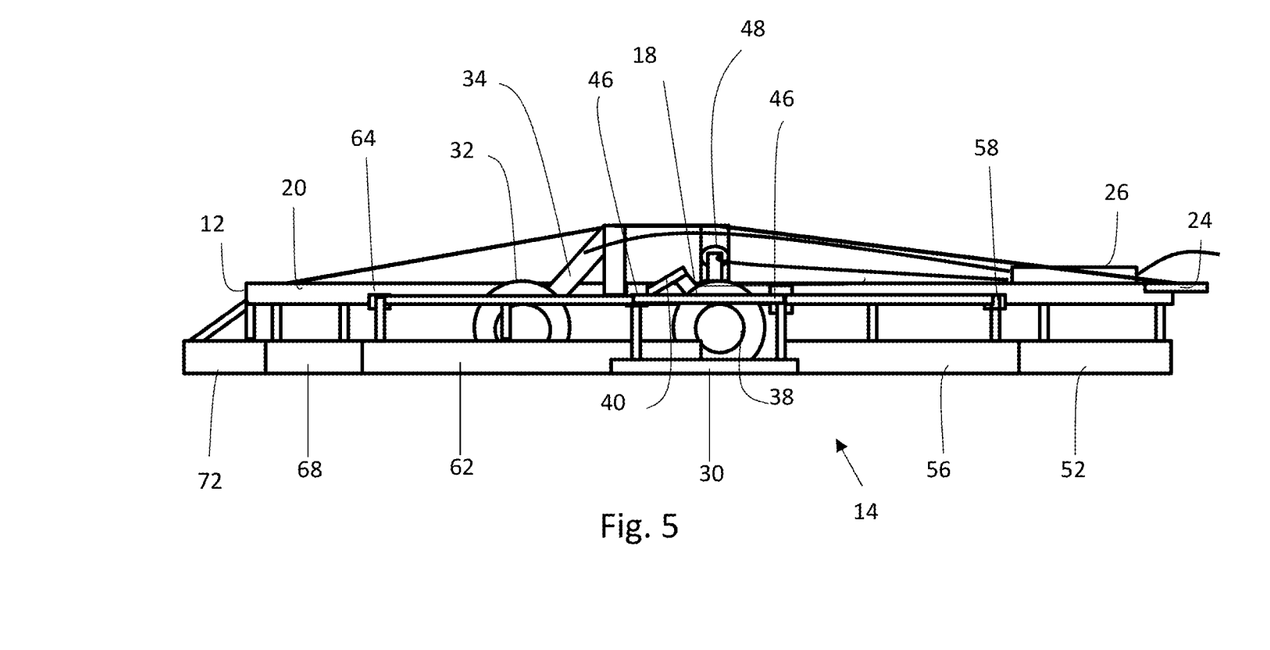
FIG. 5 is a right side view of the land plane of FIG. 1 (the left side view being substantially a mirror image thereof).
Figure 6:
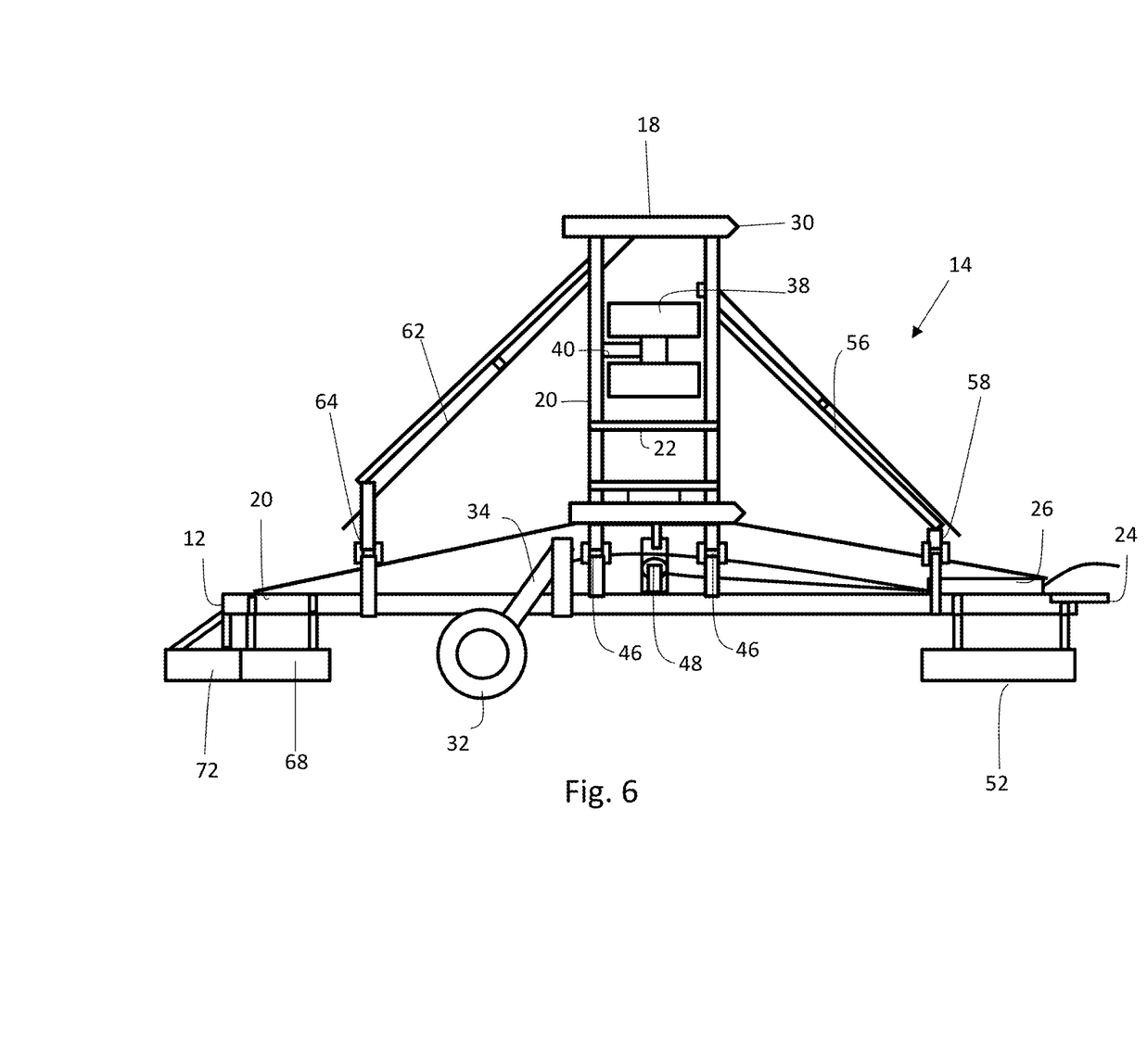
FIG. 6 is a right side view of the and plane of FIG. 2 (the left side view being substantially a mirror image thereof).

The land plane 10 described herein includes a main frame 12 with a front and opposite rear and left and right sides extending between the front and the rear of the main frame. The main frame 12 of the and plane supports a blade assembly 14 comprising a general diamond shape. The land plane main frame 12 may include a left wing assembly 16 attached to the left side of the main frame, and a right wing assembly 18 attached to the right side of the main frame. One or both of the wing assemblies 16, 18 may be pivotally attached to the main frame 12 so that the wing assemblies and pivoting sections of the blade assemblies attached thereto can be pivoted between a deployed, scraping position (FIG. 1) for use for leveling a field, and a folded or retracted position (FIG. 2) for storage or transport of the land plane over a road. The wing assemblies may also be fixed to the frame. The left and right wing assemblies may be centered on the main frame 12 and may be formed from an open framework constructed out of metal tubing cut and welded together. Beams 20, which may be formed from rectangular tubes, may extend side by side each other along length sections of the framework of both the main frame 12 and the wing assemblies 16, 18. Struts 22, which may be formed from angle iron or rectangular tube material, may extend between the beams and may be spaced apart along the length of the framework of both the main frame 12 and the wing assemblies 16, 18. The scraper blades of the blade assembly 14 may be angle iron members and may be connected to the frame work with struts comprising angle iron or tubes. For instance, round pipe may be used to support portions of the blade assembly 14 ending from the wing assemblies 16, 18 to the main frame 12. Bracing, rods and struts may be used as necessary to bolster the framework and reinforce structural components of the land plane. For ease of illustration, many of the struts and braces are not shown in the drawings.

A hitch assembly 24 may be provided at the front of the main frame to allow attachment of the land plane to the tow vehicle. The hitch may include an elongated tow bar, draw bar, sway bar and any other structure to allowing operation with the tow vehicle. A hydraulic control cylinder 26 may be mounted between the main frame 12 and the hitch assembly 24 and interface with the hydraulic controls of the tow vehicle to allow hydraulic control of the various features of the land plane from the tow vehicle. For instance, the tow vehicle hydraulics can interface with the land plane hydraulics to control from the tow vehicle features such as allowing for: (i) the land plane to be leveled for use in the field, (ii) the land plane to be raised for transport on a road, (iii) moving the wing assemblies 16, 18 of the land plane between the deployed and raised position and the retracted, folded position; and (iv) raising and lowering wheel sets on the land plane for transport over roads and for use the field to be planed. For instance, the wing assemblies may be moved to the retracted position and the wheel sets to the lowered position so that the land plane may be pulled over roads, highways, etc., to the agricultural field to be planed or leveled, and once at the agricultural field to be planed, the wing assemblies may be lowered to the deployed position and the wheel sets raised for use of the land plane in leveling. In the alternative or addition to the hydraulic control cylinder, a compressed air cylinder and compressor may be used.

The land plane 10 may be provided with one or more runners 30 which may be removably mounted to portions of the main frame via struts and braces to support the main frame above the surface of the field and to allow ease of removal when worn. The one or more runners may be attached to each of the wing assemblies 16, 18 to support the wing assemblies in the deployed positions of the wing assemblies when leveling. Main support wheels 32 may be attached to the main frame 12 to work with the runners in supporting the main frame above the surface of the field. The main support wheels may be adjustable to effectively raise and lower the land plane. For instance, hydraulic cylinders or pressurized air cylinders 34 or the like may be associated with the main support wheels 32 to allow vertical adjustment of the main support wheels so that the main support wheels can be extended to fully support the main frame, and the entire land plane when the land plane is transported over a road, and lowered as necessary for use of the land plane in the field to be planed. The hydraulic cylinder 34 may interface with the main hydraulic cylinder 26 and/or the hydraulics of the tow vehicle. Auxiliary support wheels 38 may be attached to the each wing assembly 16, 18 to work with the runners 30 and the main support wheels 32 in supporting the land frame in the field to be planed. The auxiliary support wheels may be adjustable to effectively raise and lower the land plane. For instance, hydraulic or pressurized air cylinders 40 or the like may be associated with the auxiliary support wheels 38 to allow vertical adjustment of the auxiliary support wheels so that the auxiliary support wheels can be moved to level the land plane as necessary for use in the field to be planed. The hydraulic cylinder 40 may interface with the main hydraulic cylinder 26 and/or the hydraulics of the tow vehicle. Additional sets of wheels may be added as necessary for support. For instance, one or more wheels may be arranged about the front of the land plane adjacent the main hydraulic cylinder behind the blade assembly. The wheels may have wheel wells to further stabilize the overall structure of the land plane.

Each wing assembly 16, 18 may be pivotally attached to the respective side of the main frame via hinge assemblies 46 to allow moving of the blade assemblies or parts thereof between the deployed and retracted positions. For instance, a hydraulic cylinder assembly 48 may be used to allow the operator of the land plane to move the wing assemblies between the deployed and the folded positions. One hydraulic cylinder may be used for moving one wing assembly and a different hydraulic cylinder may be used for moving the other wing assembly. The hydraulic cylinders may operated independently so one wing assembly may be moved between the deployed and the retracted positions independently of the other wing assembly. In the alternative, one hydraulic cylinder may be used with linkages to move both wing assemblies simultaneously between the deployed and retracted positions. The hydraulic cylinder may interface with the main hydraulic cylinder 26 of the land plane and/or the tow vehicle hydraulics. A compressed air cylinder, or a mechanical drive may also be used in lieu of a hydraulic cylinder. The main frame may include a stop with a yoke (not shown) extending vertically upward from the main frame adjacent to the wing assembly hinge assembly 46. The stop may receive a portion of the wing assembly beam in the yoke of the stop. The beam may then be fastened in the yoke to secure the wing assembly in the folded position, for instance, for transport of the land plane over a road or highway. As mentioned above, one or both of the wing assemblies may also be fixed to the frame thus dispensing with the need for a fluid cylinder to move the wing assembly.

The land plane scraper blade assembly 14 may be mounted to and beneath the main frame 12 via braces and struts in a manner that allows independent manual adjustment for height and tension and ease of removal when worn. The blade assembly 14 includes left and right front blade assemblies 50, 52, 54, 56. The left and right front blade assemblies may include front non-pivoting blade assemblies 50, 52 connected to respective sides of the main frame. The front non-pivoting blade assemblies 50, 52 may each have leading edges that may be at least adjacent to one another or abut one another and may be arranged at the center of the main frame 12 at the front of the frame. The front non-pivoting blade assemblies 50, 52 may each have trailing edges arranged spaced away from the main frame such that the front non-pivoting blade assemblies 50, 52 form an inverted V-shape (FIG. 1) with an apex adjacent to the front of the main frame 12 adjacent to the hitch assembly 24 of the and plane. The trailing edges of non-pivoting sections of the first and second front blade assemblies may be spaced apart from one another on lateral sides of the frame at a first distance.

Figure 7:
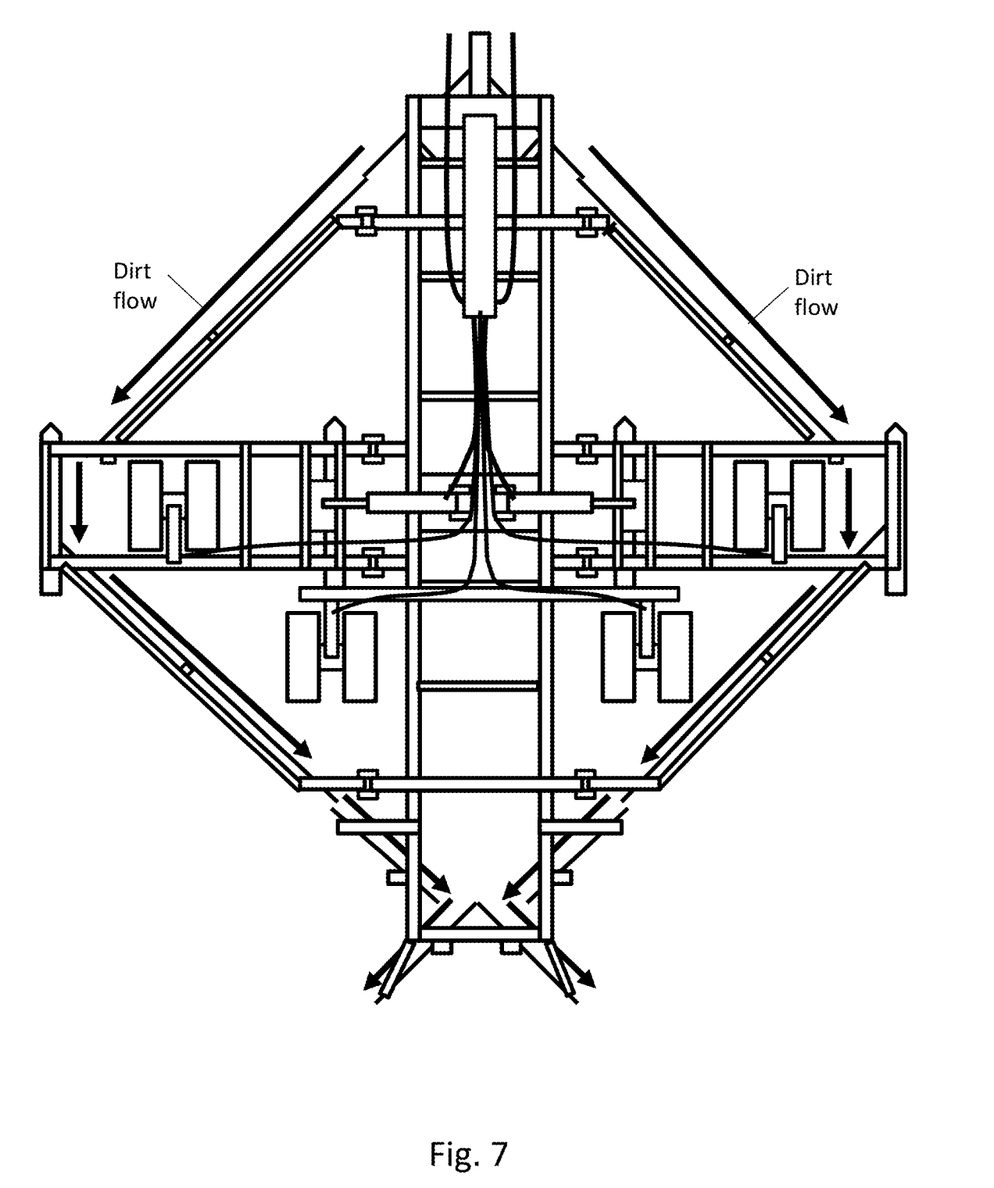
FIG. 7 is a top plan view of the land plane of FIG. 1 showing the flow of dirt through the land plane.

The left and right front blade assemblies of the blade assembly 14 may also include left and right front pivoting blade sections 54, 56 with leading and trailing edges. The leading edge of each of the left and right front pivoting blade section sections 54, 56 may be pivotally connected to the main frame 12 via a hinge assembly 58, and the trailing edge of each of the left and right front pivoting blade section sections 54, 56 may be connected to the respective wing assembly 16, 18. Accordingly, each of the left and right front pivoting blade sections 54, 56 may be pivotable relative to the main frame 12 and moveable between a deployed position and a folded position. In the deployed position, the front pivoting blade sections 54, 56 are in position for scraping with the front pivoting blade leading edge generally adjacent to (e.g., abutting or overlapping with and behind) the respective front non-pivoting blade trailing edge. The trailing edges of the pivoting sections of the first and second front blade assemblies may be spaced apart from one another on lateral sides of the frame at a second distance greater than the first distance. The trailing edges of the pivoting sections of the first and second front blade assemblies may be spaced intermediate of the front of the frame 12 and the rear of the frame. Accordingly, the trailing edge of the front pivoting blade sections 54, 56 is spaced at a distance from the main frame 12 that is greater than the leading edge of the front pivoting blade assemblies so that the overall appearance of the left and right front non-pivoting blade sections 50, 52, and left and right front pivoting blade sections 54, 56 is an inverted V-shape, and the general flow of dirt scraped by the front non-pivoting and front pivoting blade sections is away from the center of the main frame as shown in FIG. 7. In the folded position, the left and right front pivoting blade assemblies 54, 56 may be pivoted upward out of the scraping position so as to decrease the width of the land plane to allow transport of the land plane over a road or highway. The hinge assembly 58 may be omitted so pivoting of the pivoting sections of the left and right front blade assemblies is made via the pivoting wing assembly.

The blade assembly 12 also includes left and right rear blade assemblies 60, 62, 66, 68. The left and right blade assemblies may include pivoting blade sections 60, 62 with leading and trailing edges. The leading edge of each of the left and right rear pivoting blade sections 60, 62 may be connected to the respective wing assembly 16, 18, and the trailing edge of each of the left and right rear pivoting blade sections may be pivotally connected to the main frame via a hinge assembly 64. Accordingly, each of the left and right rear pivoting blade sections 60, 62 is pivotable relative to the main frame 12 and moveable between a deployed position and a folded position. The left and right rear pivoting blade sections 60, 62 may be moveable between the deployed position and the folded position together with the left and right front pivoting blade assemblies 54, 56 as the wing assemblies 16, 18 are pivoted between the deployed and folded positions. In the deployed position, the rear pivoting blade assemblies 60, 62 are in position for scraping with the leading edge of the rear pivoting blade 60, 62 spaced from the trailing edge of the respective front pivoting blade 54, 56 to form a gap 66 between the rear pivoting blade leading edge and the respective front pivoting blade trailing edge. Accordingly, the leading edges of the pivoting sections of the first and second rear blade assemblies may be spaced apart from one another on lateral sides of the frame at a third distance when the pivoting sections of the first and second rear blade assemblies are in the deployed position. The leading edges of the pivoting sections of the first and second rear blade assemblies may be intermediate of the front of the frame and the rear of the frame. The third distance may be greater than the second distance. The trailing portions of the pivoting sections of the first and second rear blade assemblies may be spaced apart from one another on lateral sides of the frame at a fourth distance when the pivoting sections of the first and second rear blade assemblies are in the deployed position. The third distance may be greater than the fourth distance. Accordingly, the trailing edges of the rear pivoting blade sections are arranged closer to the main frame than the leading edges of the rear pivoting blade sections so that dirt flow scraped by the rear pivoting blade assemblies is generally directed back toward the center of the main frame as shown in FIG. 7. In the folded position, the left and right rear pivoting blade assemblies may be pivoted upward out of the scraping position so as to decrease the width of the land plane and allow transport of the land plane on a road. The hinge assembly 64 may be omitted so pivoting of the pivoting sections of the left and right rear blade assemblies is made via the pivoting wing assembly.

The left and right rear blade assemblies of the blade assembly 14 also includes left and right rear non-pivoting blade sections 66, 68 each with leading edges arranged generally adjacent to (e.g., abutting or overlapping with and behind) the trailing edges of the rear pivoting blade sections, and the trailing edges of the left and right rear non-pivoting blade sections 6668 may be arranged toward the center of the main frame at a fifth distance. The fourth distance may be greater than the fifth distance. The rear pivoting blade sections 60, 62 and the rear non-pivoting blade sections 66, 68 together form a partial V-shape with a general apex at the rear center of the main frame 12. The trailing edges of the rear non-pivoting blade sections 66, 68 may be spaced apart to form a discharge 70 for the land plane and allow the dirt flow directed back toward the center of the main frame to exit the land plane generally laterally away from the main frame. The discharge 70 may have diverging scraper blade assemblies 72 arranged rearwardly and laterally away from the rear of the frame to disperse dirt flow away from the center of the main frame as the dirt flow is discharged from the land plane through the discharge 70 between the trailing edges of the rear non-pivoting blade assemblies 66, 68. The discharge diverging scraper blade assemblies 72 may each have leading and trailing edges. The leading edges of the discharge blade assemblies are at least adjacent to each other at the center of the frame adjacent to the rear of the frame.

The pivoting sections of the left and right front blade assemblies may be moveable between the deployed position and the retracted position independently of each other. The pivoting sections of the left and right rear blade assemblies may be moveable between the deployed position and the retracted position independently of each other. Depending upon the configuration of the land plane and the configuration of the wing assemblies, the pivoting section of the left front blade assembly and the left rear blade assembly may be moved independently of each other. Depending upon the configuration of the and plane and the configuration of the wing assemblies, the pivoting section of the right front blade assembly and the right rear blade assembly may be moved independently of each other.

Accordingly, the overall appearance of the blade assembly of the land plane with the pivoting blade sections in the scraping or deployed position is a diamond shape. The diamond shape provides a sufficiently wide width (e.g., about 30-35 feet) to allow a relatively large area of field to be leveled in one pass while providing a sufficiently long length (e.g., about 35-40 feet) to efficiently drag and level the field. With the wing structure in the folded position, the land plane may have a length of approximately 35-40 feet and an overall width of approximately 16 feet.

Although the land plane has been described and illustrated with respect to a preferred embodiment and a preferred use therefor, it is not to be so limited since modifications and changes can be made therein which are within the full intended scope of the invention.

What is claimed is:

1. A land plane comprising:

a frame having a front and an opposite rear, and a first side and an opposite second side extending between the front and rear of the frame, the front of the frame having a tow hitch configured to removably attach the land plane to a tow vehicle;

first and second front blade assemblies, the first front blade assembly extending from the first side of the frame and supported by the frame, the second front blade assembly extending from the second side of the frame and supported by the frame, the first and second front blade assemblies each having leading and trailing portions, the leading portions of the first and second front blade assemblies being at least adjacent to each other at a center of the frame adjacent to the front of the frame, the trailing edges of the first and second front blade assemblies being spaced apart from one another on lateral sides of the frame at first and second front blade assembly termination positions intermediate of the front of the frame and the rear of the frame, the trailing portions of the first and second front blade assemblies being spaced apart from one another a first distance which is greater than a distance separating the leading portions of the first and second front blade assemblies when the land plane is configured for use for leveling, the first and second front blade assemblies defining an inverted "v"shape in a plan view of the frame referenced from the front of the frame to the rear of the frame when the land plane is configured for use for leveling; and first and second rear blade assemblies, the first rear blade assembly extending from the first side of the frame and supported by the frame, the second rear blade assembly extending from the second side of the frame and supported by the frame, the first and second rear blade assemblies each having leading and trailing portions, the leading portions of the first and second rear blade assemblies being spaced apart from one another on lateral sides of the frame at first and second rear blade assembly beginning positions intermediate of the front of the land plane and the rear of the land plane, the leading portions of the first and second rear blade assemblies being spaced apart from one another on lateral sides of the frame at a second distance when the land plane is configured for use in leveling a ground surface, the trailing portions of the first and second rear blade assemblies being spaced apart from one another at a third distance and adjacent to the rear of the frame when the land plane is configured for use for leveling, the second distance being greater than the first distance when the land plane is configured for use for leveling, the second distance being greater than the third distance when the land plane is configured for use for leveling a ground surface, the third distance being less than the first distance when the land plane is configured for use for leveling, the first and second rear blade assemblies defining an "V"shape in the plan view of the land plane referenced from the front of the frame to the rear of the frame when the land plane is configured for use for leveling;

wherein the first and second front blade assemblies have sections that are pivotally mounted to the respective first and second sides of the frame, the pivoting sections of the first and second front blade assemblies being movable between a deployed position when the land plane is configured for use in leveling a ground surface and a retracted position when the land plane is not configured for use in leveling a ground surface, the trailing portions of the first and second front blade assemblies being at the first distance in the deployed position, the trailing portions of the first and second front blade assemblies being at a distance less than the first distance in the retracted position.

2. A land plane comprising:

a frame having a front and an opposite rear, and a first side and an opposite second side extending between the front and rear of the frame, the front of the frame having a tow hitch configured to removably attach the land plane to a tow vehicle;

first and second front blade assemblies, the first front blade assembly extending from the first side of the frame and supported by the frame, the second front blade assembly extending from the second side of the frame and supported by the frame, the first and second front blade assemblies each having leading and trailing portions, the leading portions of the first and second front blade assemblies being at least adjacent to each other at a center of the frame adjacent to the front of the frame, the trailing edges of the first and second front blade assemblies being spaced apart from one another on lateral sides of the frame at first and second front blade assembly termination positions intermediate of the front of the frame and the rear of the frame, the trailing portions of the first and second front blade assemblies being spaced apart from one another a first distance which is greater than a distance separating the leading portions of the first and second front blade assemblies when the land plane is configured for use for leveling, the first and second front blade assemblies defining an inverted "v"shape in a plan view of the frame referenced from the front of the frame to the rear of the frame when the land plane is configured for use for leveling; and first and second rear blade assemblies, the first rear blade assembly extending from the first side of the frame and supported by the frame, the second rear blade assembly extending from the second side of the frame and supported by the frame, the first and second rear blade assemblies each having leading and trailing portions, the leading portions of the first and second rear blade assemblies being spaced apart from one another on lateral sides of the frame at first and second rear blade assembly beginning positions intermediate of the front of the land plane and the rear of the land plane, the leading portions of the first and second rear blade assemblies being spaced apart from one another on lateral sides of the frame at a second distance when the land plane is configured for use in leveling a ground surface, the trailing portions of the first and second rear blade assemblies being spaced apart from one another at a third distance and adjacent to the rear of the frame when the land plane is configured for use for leveling, the second distance being greater than the first distance when the land plane is configured for use for leveling, the second distance being greater than the third distance when the land plane is configured for use for leveling a around surface, the third distance being less than the first distance when the land plane is configured for use for leveling, the first and second rear blade assemblies defining an "V"shape in the plan view of the land plane referenced from the front of the frame to the rear of the frame when the land plane is configured for use for levelling;

wherein the first and second rear blade assemblies have sections that are pivotally mounted to the respective first and second sides of the frame, the pivoting sections of the first and second rear blade assemblies being movable between a deployed position when the land plane is configured for use in leveling a ground surface and a retracted position when the land plane is not configured for use in leveling a ground surface, the leading portions of the first and second rear blade assemblies being at the second distance in the deployed position, the leading portions of the first and second rear blade assemblies being at a distance less than the second distance in the retracted position.

3. A land plane comprising:

a frame having a front and an opposite rear, and a first side and an opposite second side extending between the front and rear of the frame, the front of the frame having a tow hitch configured to removably attach the land plane to a tow vehicle;

first and second front blade assemblies, the first front blade assembly extending from the first side of the frame and supported by the frame, the second front blade assembly extending from the second side of the frame and supported by the frame, the first and second front blade assemblies each having leading and trailing portions, the leading portions of the first and second front blade assemblies being at least adjacent to each other at a center of the frame adjacent to the front of the frame, the trailing edges of the first and second front blade assemblies beinq spaced apart from one another on lateral sides of the frame at first and second front blade assembly termination positions intermediate of the front of the frame and the rear of the frame, the trailing portions of the first and second front blade assemblies being spaced apart from one another a first distance which is greater than a distance separating the leading portions of the first and second front blade assemblies when the land plane is configured for use for leveling, the first and second front blade assemblies defining an inverted "v"shape in a plan view of the frame referenced from the front of the frame to the rear of the frame when the land plane is configured for use for leveling; and first and second rear blade assemblies, the first rear blade assembly extending from the first side of the frame and supported by the frame, the second rear blade assembly extending from the second side of the frame and supported by the frame, the first and second rear blade assemblies each having leading and trailing portions, the leading portions of the first and second rear blade assemblies being spaced apart from one another on lateral sides of the frame at first and second rear blade assembly beginning positions intermediate of the front of the land plane and the rear of the land plane, the leading portions of the first and second rear blade assemblies being spaced apart from one another on lateral sides of the frame at a second distance when the land plane is configured for use in levelling a ground surface, the trailing portions of the first and second rear blade assemblies being spaced apart from one another at a third distance and adjacent to the rear of the frame when the land plane is configured for use for leveling, the second distance being greater than the first distance when the land plane is configured for use for leveling, the second distance being greater than the third distance when the land plane is configured for use for leveling a ground surface, the third distance being less than the first distance when the land plane is configured for use for leveling, the first and second rear blade assemblies defining an "V"shape in the plan view of the land plane referenced from the front of the frame to the rear of the frame when the land plane is configured for use for leveling;

wherein the first and second front blade assemblies have sections that are pivotally mounted to the respective first and second sides of the frame and the first and second rear blade assemblies have sections that are pivotally mounted to the respective first and second sides of the frame, the first front blade pivoting section being movable with the first rear blade pivoting section, the second front blade pivoting section being moveable with the second rear blade pivoting section, the first front blade pivoting section and the first rear pivoting section being moveable between a deployed position when the land plane is configured for use in leveling a ground surface and a retracted position when the land plane is not configured for use in leveling a ground surface, the second front blade pivoting section and the second rear pivoting section being moveable between a deployed position when the land plane is configured for use in leveling a ground surface and a retracted position when the land plane is not configured for use in leveling a ground surface.

4. The land plane of claim 3 wherein the first front blade pivoting section and the first rear pivoting section are moveable between the deployed position and the retracted position independently of the second front blade pivoting section and the second rear pivoting section moving between the deployed position and the retracted position.

5. The land plane of claim 3 further comprising discharge blade assemblies angled laterally and rearwardly away from the rear of the frame.

6. A land plane comprising:

a frame having a front and a rear, and a first side and an opposite second side extending between the front and rear of the frame, the front of the frame having a tow hitch configured to removably attach the land plane to a tow vehicle;

first and second front blade assemblies, the first front blade assembly extending from the first side of the frame and supported by the frame, the second front blade assembly extending from the second side of the frame and supported by the frame, the first and second front blade assemblies each having a pivoting section and a non-pivoting section, the pivoting sections of the first and second front blade assemblies being moveable between a deployed position when the land plane is configured for use for leveling and a retracted position when the land plane is not configured for use for leveling, the pivoting section and the non-pivoting section of the first and second front blade assemblies each having leading and trailing edges, the leading edges of the non-pivoting sections of the first and second front blade assemblies being at least adjacent to each other at a center of the frame adjacent to the front of the frame, the trailing edges of non-pivoting sections of the first and second front blade assemblies being spaced apart from one another on lateral sides of the frame at a first distance, the leading edges of the pivoting sections of the first and second front blade assemblies being adjacent to the trailing edges of the non-pivoting sections of the first and second front blade assemblies with the pivoting sections of the first and second front blade assemblies in the deployed position, the trailing edges of the pivoting sections of the first and second front blade assemblies being spaced apart from one another on lateral sides of the frame at a second distance greater than the first distance, the first and second front blade assemblies defining an inverted "v"shape in a plan view of the frame referenced from the front of the frame to the rear of the frame when the pivoting sections of the first and second front blade assemblies are in the deployed position; and first and second rear blade assemblies, the first rear blade assembly extending from the first side of the frame and supported by the frame, the second rear blade assembly extending from the second side of the frame and supported by the frame, the first and second rear blade assemblies each having a pivoting section and a non-pivoting section, the pivoting sections of the first and second rear blade assemblies being moveable between a deployed position when the land plane is configured for use for leveling and a retracted position when the land plane is not configured for use for leveling, the pivoting sections and the non-pivoting sections of the first and second rear blade assemblies each having leading and trailing edges, the leading edges of the pivoting sections of the first and second rear blade assemblies being spaced apart from one another on lateral sides of the frame at a third distance when the pivoting sections of the first and second rear blade assemblies are in the deployed position, the trailing edges of the pivoting sections of the first and second rear blade assemblies being spaced apart from one another on lateral sides of the frame at a fourth distance when the pivoting sections of the first and second rear blade assemblies are in the deployed position, the trailing edges of the pivoting sections of the first and second rear blade assemblies being adjacent to the leading edges of the non-pivoting sections of the first and second rear blade assemblies, the trailing edges of the non-pivoting sections of the first and second rear blade assemblies being spaced apart from one another at a fifth distance and adjacent to the rear of the frame, the third distance being greater than the second, the third distance being greater than the fourth distance, the fourth distance being greater than the fifth distance, the first and second rear blade assemblies defining an "V"shape in the plan view of the land plane referenced from the front of the frame to the rear of the frame when the pivoting sections of the first and section rear blade assemblies are in the deployed position.

7. The land plane of claim 6 wherein the pivoting sections of the first front blade assembly and the first rear blade assembly move together between the deployed position and the retracted position.

8. The land plane of claim 7 wherein the pivoting sections of the second front blade assembly and the second rear blade assembly move together between the deployed position and the retracted position.

9. The land plane of claim 8 wherein the pivoting sections of the first front blade assembly and the first rear blade assembly are moveable between the deployed position and the retracted position independently of the pivoting sections of the second front blade assembly and the second rear blade assembly.

10. The land plane of claim 8 further comprising a pressurized fluid cylinder adapted and configured to move the first front blade assembly pivoting section and the first rear blade assembly pivoting section between the deployed position and the retracted position.

11. The land plane of claim 8 further comprising a pressurized fluid cylinder adapted and configured to move the second front blade assembly pivoting section and the second rear blade assembly pivoting section between the deployed position and the retracted position.

12. The land plane of claim 8 further comprising a first wing frame operatively pivotally connected to the first side of the frame, the trailing edge of the pivoting section of the first front blade assembly, and the leading edge of the pivoting section of the first rear blade assembly.

13. The land plane of claim 12 further comprising a first front hinge connection and a first rear hinge connection, the first front hinge connection operatively pivotally connecting the first side of the frame and the leading edge of the pivoting section of the first front blade assembly, the first rear hinge connection operatively pivotally connecting the trailing edge of the pivoting section of the first rear blade assembly to the first side of the frame.

14. The land plane of claim 12 further comprising at least one runner for the first wing frame adapted and configured to support the first wing frame with the pivoting sections of the first front and first rear blade assemblies in the deployed position.

15. The land plane of claim 8 further comprising a second wing frame operatively pivotally connected to the second side of the frame and the trailing edge of the pivoting section of the second front blade assembly and the leading edge of the pivoting section of the second rear blade assembly.

16. The land plane of claim 15 further comprising a second front hinge connection and a second rear hinge connection, the second front hinge connection operatively pivotally connecting the second side of the frame and the leading edge of the pivoting section of the second front blade assembly, the second rear hinge connection operatively pivotally connecting the trailing edge of the pivoting section of the second rear blade assembly to the second side of the frame.

17. The land plane of claim 15 further comprising at least one runner for the second wing frame adapted and configured to support the second wing frame with the pivoting sections of the second front and second rear blade assemblies in the deployed position.

18. The land plane of claim 6 further comprising discharge blade assemblies angled laterally and rearwardly away from the rear of the frame.

19. The land plane of claim 18 wherein the discharge blade assemblies each have leading and trailing edges, the leading edges of the discharge blade assemblies are at least adjacent to each other at the center of the frame adjacent to the rear of the frame.

\* \* \* \* \*